United States Patent
Mochizuki et al.

(10) Patent No.: US 12,148,176 B2
(45) Date of Patent: Nov. 19, 2024

(54) COMPARISON APPARATUS, CONTROL METHOD, AND PROGRAM

(71) Applicant: NEC Corporation, Tokyo (JP)

(72) Inventors: Shihono Mochizuki, Tokyo (JP); Satoshi Terasawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 513 days.

(21) Appl. No.: 17/439,928

(22) PCT Filed: Mar. 27, 2019

(86) PCT No.: PCT/JP2019/013243
§ 371 (c)(1),
(2) Date: Sep. 16, 2021

(87) PCT Pub. No.: WO2020/194585
PCT Pub. Date: Oct. 1, 2020

(65) Prior Publication Data
US 2022/0189046 A1 Jun. 16, 2022

(51) Int. Cl.
*G06T 7/38* (2017.01)
*G06T 7/207* (2017.01)
(Continued)

(52) U.S. Cl.
CPC ............... *G06T 7/38* (2017.01); *G06T 7/207* (2017.01); *G06T 7/73* (2017.01); *G06V 20/52* (2022.01);
(Continued)

(58) Field of Classification Search
CPC .. G06T 7/207; G06T 7/38; G06T 7/73; G06T 2207/30201; G06T 2207/30232; G06V 40/167; G06V 40/172; G06V 20/52
See application file for complete search history.

(56) References Cited

U.S. PATENT DOCUMENTS

| 2014/0015978 A1* | 1/2014 | Smith ............... G07B 15/02 348/156 |
| 2014/0341427 A1 | 11/2014 | Kawano |

(Continued)

FOREIGN PATENT DOCUMENTS

| CN | 108701225 A | 10/2018 |
| CN | 109186584 A | 1/2019 |

(Continued)

OTHER PUBLICATIONS

International Search Report for PCT Application No. PCT/JP2019/013243, mailed on Jun. 11, 2019.

(Continued)

*Primary Examiner* — Shefali D Goradia

(57) ABSTRACT

A comparison apparatus (2000) extracts an image feature (22) from a detected object (20) detected from a captured image (12) generated by a camera (10). The comparison apparatus (2000) determines the detected object (20) using the extracted image feature (22) and object information (30) of each of a plurality of registered objects. Here, in the object information (30) of each registered object, an object identifier (32) of the registered object is associated with an image feature (34) of the registered object. The comparison apparatus (2000) determines a comparison order of the object information (30) based on position information (40) of each registered object, and determines the detected object (20) by comparing the image feature (34) indicated in the object information (30) with the image feature (22) in order from the object information (30) of which the determined comparison order is earlier.

20 Claims, 5 Drawing Sheets

(51) Int. Cl.
*G06T 7/73* (2017.01)
*G06V 20/52* (2022.01)
*G06V 40/16* (2022.01)

(52) U.S. Cl.
CPC .......... *G06V 40/167* (2022.01); *G06V 40/172* (2022.01); *G06T 2207/30201* (2013.01); *G06T 2207/30232* (2013.01)

(56) References Cited

U.S. PATENT DOCUMENTS

| | | | |
|---|---|---|---|
| 2016/0275354 A1 | 9/2016 | Andaló et al. | |
| 2018/0314893 A1* | 11/2018 | Tsukamoto | G06T 7/246 |
| 2019/0050631 A1* | 2/2019 | Hayase | G06T 7/38 |

FOREIGN PATENT DOCUMENTS

| | | |
|---|---|---|
| JP | 2008-158678 A | 7/2008 |
| JP | 2010-079609 A | 4/2010 |
| JP | 2014-241578 A | 12/2014 |
| JP | 2017-059060 A | 3/2017 |
| WO | 2017/146160 A1 | 8/2017 |

OTHER PUBLICATIONS

TW Office Action for TW Application No. 109106875, mailed on Sep. 21, 2022 with English Translation.

* cited by examiner

COMPARISON APPARATUS, CONTROL METHOD, AND PROGRAM

This application is a National Stage Entry of PCT/JP2019/013243 filed on Mar. 27, 2019, the contents of all of which are incorporated herein by reference, in their entirety.

TECHNICAL FIELD

The present invention relates to a technique of determining an object included in a captured image.

BACKGROUND ART

A technique of determining an object included in a captured image obtained from a camera has been disclosed. For example, Patent Document 1 discloses a technique of extracting a biometric registration image associated with a mobile terminal within a predetermined range from a biometric comparison apparatus and comparing the extracted biometric registration image with input biometric information of a user. Position information of each mobile terminal is periodically transmitted to the biometric comparison apparatus.

RELATED DOCUMENT

Patent Documents

[Patent Document 1] Japanese Patent Application Publication No. 2017-59060

SUMMARY OF THE INVENTION

Technical Problem

In the invention disclosed in Patent Document 1, when there are many persons who own a mobile terminal within the predetermined range from the biometric comparison apparatus, many biometric registration images are extracted as comparison targets. Thus, a time required for determining a user is increased.

The present invention has been made in view of the above-described problem, and an object of the present invention is to provide a technique of shortening a time required for determining an object included in a captured image.

Solution to Problem

A comparison apparatus according to the present invention includes: 1) an extraction unit that acquires a captured image generated by a camera and extracts an image feature of a detected object detected from the acquired captured image; and 2) a determination unit that determines the detected object using the extracted image feature and object information of each of a plurality of registered objects.

The object information of each of the registered objects includes an image feature of the registered object.

The determination unit determines a comparison order of the object information based on position information of each of the registered objects, and determines the detected object by comparing the image feature included in the object information with the extracted image feature in order from the object information whose the determined comparison order is earlier.

A control method according to the present invention is executed by a computer. The control method includes: 1) an extraction step of acquiring a captured image generated by a camera and extracting an image feature of a detected object detected from the acquired captured image; and 2) a determination step of determining the detected object using the extracted image feature and object information of each of a plurality of registered objects.

The object information of each of the registered objects includes an image feature of the registered object.

In the determination step, a comparison order of the object information is determined based on position information of each of the registered objects, and the detected object is determined by comparing the image feature included in the object information with the extracted image feature in order from the object information whose the determined comparison order is earlier.

A program according to the present invention causes a computer to execute each step of the control method according to the present invention.

Advantageous Effects of Invention

According to the present invention, there is provided a technique of shortening a time required for determining an object included in a captured image.

BRIEF DESCRIPTION OF THE DRAWINGS

The above-described object and other objects, features, and advantages will be further clarified by the preferred embodiment to be described below and the accompanying drawings attached herein.

DESCRIPTION OF EMBODIMENTS

Figure 1:
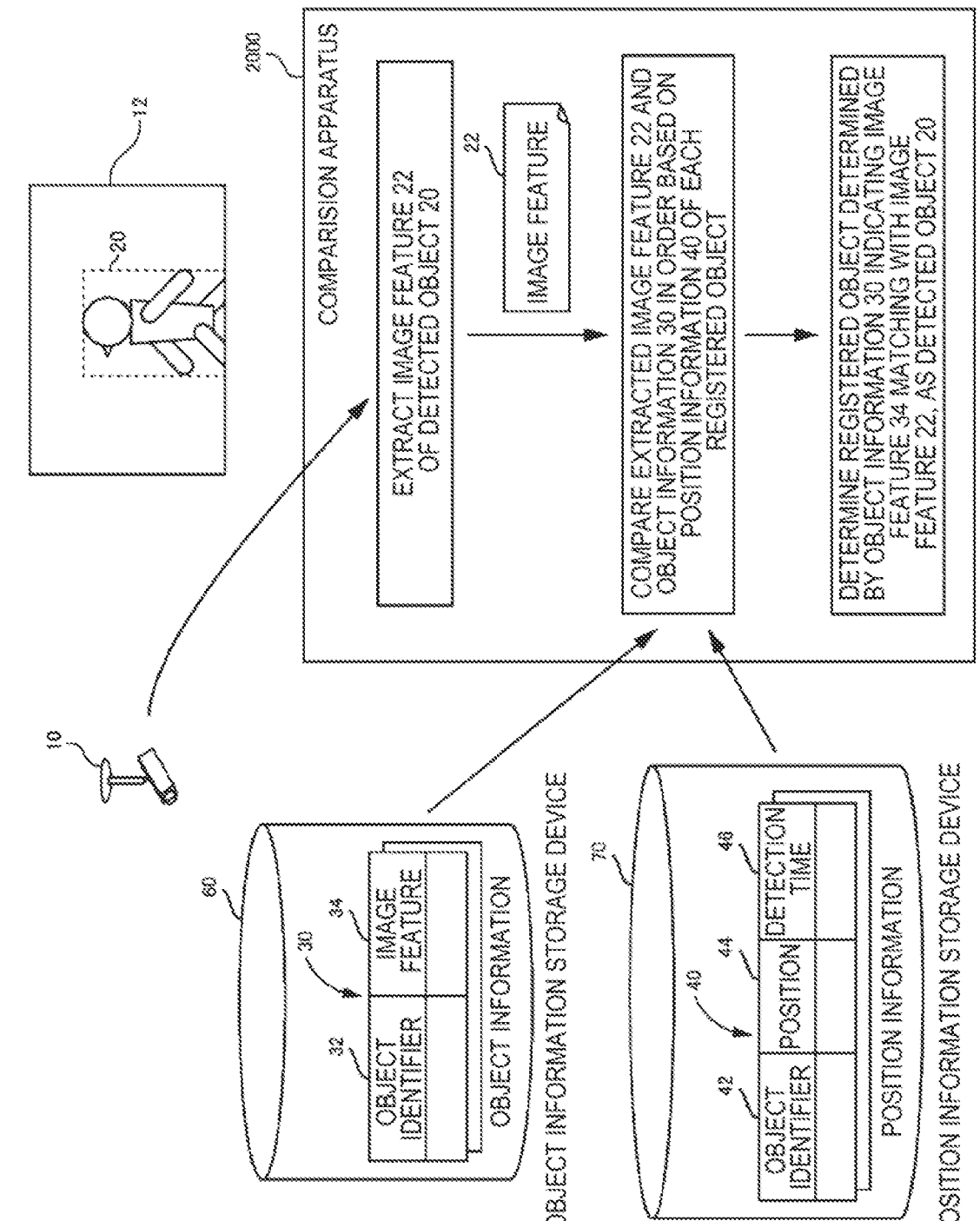
FIG. 1 is a diagram illustrating an outline of an operation of a comparison apparatus according to the present example embodiment.

Hereinafter, an example embodiment of the present invention will be described with reference to the drawings. Note that, in all the drawings, the same reference numerals are given to the same components and the description will not be repeated as appropriate. Further, unless otherwise specified, in each block diagram, each block represents a functional unit configuration, not a hardware unit configuration.

<Outline>

FIG. 1 is a diagram illustrating an outline of an operation of a comparison apparatus 2000 according to the present example embodiment. FIG. 1 is a diagram illustrating a conceptual description for facilitating understanding of the operation of the comparison apparatus 2000, and does not specifically limit the operation of the comparison apparatus 2000.

The comparison apparatus 2000 is an apparatus that determines an object captured by a camera 10 using a captured image 12 obtained from the camera 10. For example, the camera 10 is a surveillance camera provided in a facility such as an airport or a stadium. Here, a place where the camera 10 is provided is not limited to indoors, and may be outdoors.

Here, "determining an object" means determining a registered object that matches with an object detected from the captured image 12 (detected object 20), from a plurality of known objects (hereinafter, referred to as registered objects). Further, "registered object" here means an object for which there exists information (object information 30, described later) that associates an identifier of that object with an image feature being a feature value of that object in an image.

The matching apparatus 2000 extracts a feature value (an image feature 22) of the detected object 20 in the image, the detected object 20 being detected from the captured image 12. As the image feature, various feature values that can be extracted from the image may be used. Here, the detected object 20 is, for example, a person. In a case where the detected object 20 is a person, it is assumed that processing performed by the comparison apparatus 2000 is processing of "determining a person among known persons that matches with the person detected from the captured image 12". Here, the detected object 20 is not limited to a person. For example, the detected object 20 may be an animal, a machine (a car or a robot), or the like.

The comparison apparatus 2000 determines the detected object 20 using a plurality of pieces of object information 30. Each of the pieces of object information 30 is information in which an identifier of a registered object (an object identifier 32) is associated with an image feature of the registered object (image feature 34). The object information 30 is stored in an object information storage device 60.

The comparison apparatus 2000 determines an image feature 34 that matches with the image feature 22 (for example, an image feature 34 whose similarity with the image feature 22 is equal to or greater than a threshold value), by comparing the image feature 22 of the detected object 20 obtained from the captured image 12 with the image feature 34 indicated by each of the pieces of object information 30. The object identifier 32 associated with the determined image feature 34 is determined as an identifier of the detected object 20. Thereby, the detected object 20 is determined.

Here, the comparison apparatus 2000 determines an order (comparison order) of the object information 30 used for comparison of the image feature 22 and the image feature 34, based on position information 40 of each registered object. In the position information 40, an identifier of the registered object (object identifier 42), a position of the registered object (position 44), and a time when the position is detected (detection time 46) are associated with each other. Here, the detection time 46 does not necessarily have to be included in the position information 40. For example, as the position 44 indicated in the position information 40 is closer to the position of the camera 10, the comparison apparatus 2000 uses, for comparison, the object information 30 of the registered object at an earlier timing. The position information 40 is stored in a position information storage device 70.

<Representative Advantageous Effect>

The comparison apparatus 2000 according to the present example embodiment determines the detected object 20, by comparing the image feature 34 indicated in the object information 30 and the image feature 22, in comparison order based on the position information 40 of each registered object. In this way, by performing comparison in order in which the position of the registered object is considered, the object information 30 of the registered object, which is estimated to be likely to match with the detected object 20, is used for comparison at an earlier timing. Therefore, a time required for determining the detected object 20 can be shortened.

In addition, according to the comparison apparatus 2000 of the present example embodiment, each of the pieces of object information 30 is used for comparison in order, and thus the object information 30 of each registered object is used for comparison at any timing Therefore, even when a frequency of updating the position information 40 is reduced and thus the position indicated by the position information 40 of the registered object matching with the detected object 20 is greatly different from the actual current position of the registered object, this does not result in that the object information 30 of the registered object is not used for comparison and thus the detected object 20 cannot be determined. Accordingly, the frequency of updating the position information 40 can be flexibly determined in consideration of a processing load of the comparison apparatus 2000 and the like.

Hereinafter, the comparison apparatus 2000 according to the present example embodiment will be described in more detail.

<Example of Functional Configuration of Comparison Apparatus 2000>

Figure 2:
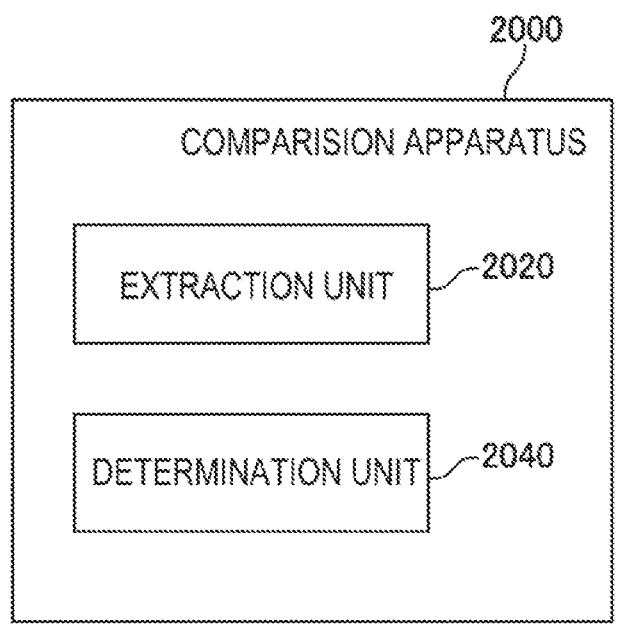
FIG. 2 is a diagram illustrating a configuration of the comparison apparatus according to an example embodiment 1.

FIG. 2 is a diagram illustrating a configuration of the comparison apparatus 2000 according to an example embodiment 1. The comparison apparatus 2000 includes an extraction unit 2020 and a determination unit 2040. The extraction unit 2020 extracts an image feature 22 (an image feature of the detected object 20) from the captured image 12 generated by the camera 10. The determination unit 2040 determines the detected object 20 using the image feature 22 and the plurality of pieces of object information 30. Here, the determination unit 2040 determines a comparison order of the object information 30 based on the position information 40 of each registered object. The determination unit 2040 determines the detected object 20 by comparing the image feature 34 indicated in the object information 30 with the image feature 22 in order from the object information 30 whose determined comparison order is earlier.

<Hardware Configuration of Comparison Apparatus 2000>

Each functional unit of the comparison apparatus 2000 may be realized by hardware (for example, a hard-wired electronic circuit) that realizes each functional unit, or a combination of hardware and software (for example, a combination of an electronic circuit and a program for controlling the electronic circuit). Hereinafter, a case where each functional unit of the comparison apparatus 2000 is realized by a combination of hardware and software will be described.

Figure 3:
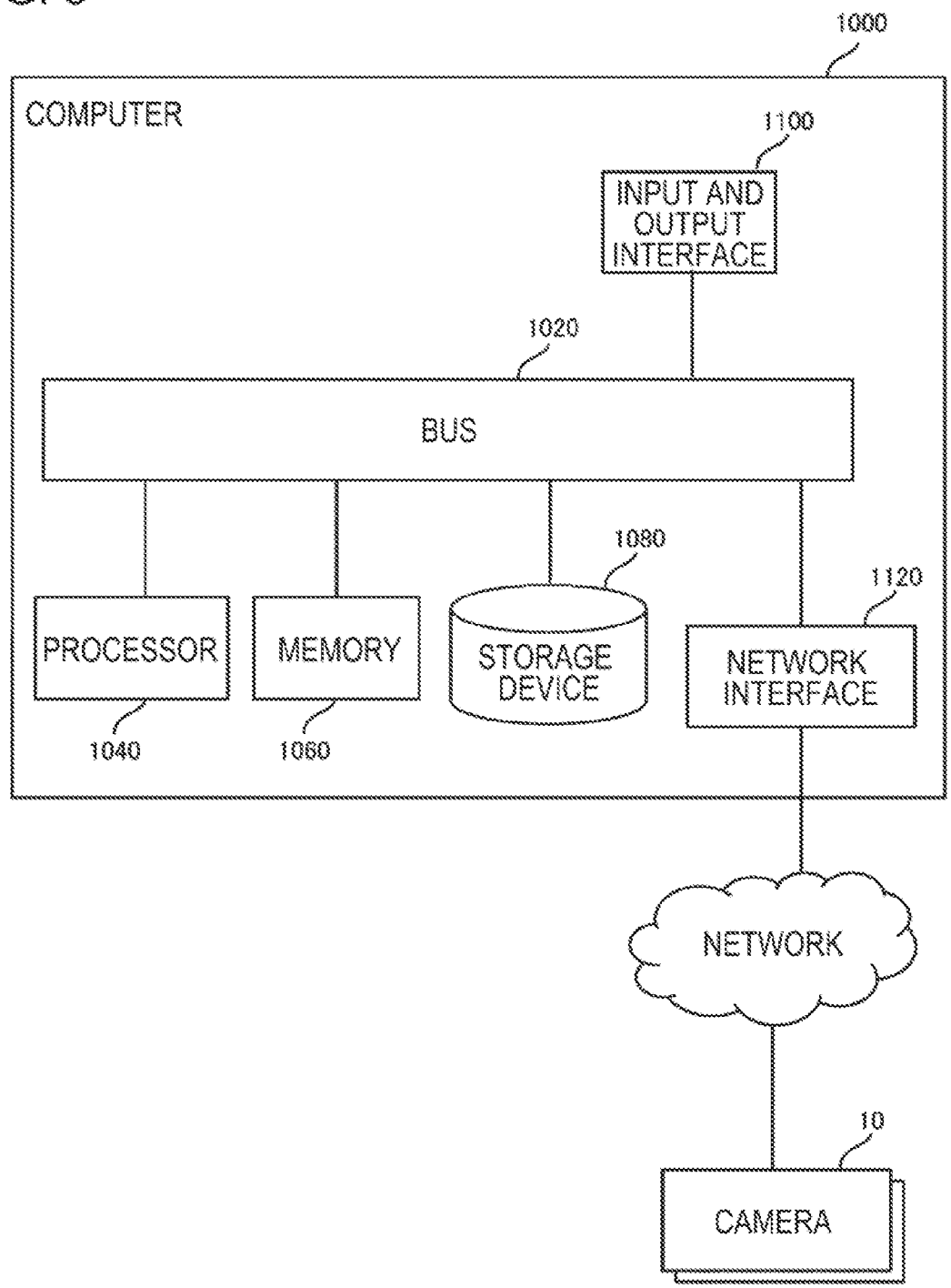
FIG. 3 is a diagram illustrating a computer for realizing the comparison apparatus.

FIG. 3 is a diagram illustrating a computer 1000 for realizing the comparison apparatus 2000. The computer 1000 is a certain computer. For example, the computer 1000 is a personal computer (PC), a server machine, a tablet terminal, or a smartphone. The computer 1000 may be a dedicated computer designed for realizing the comparison apparatus 2000, or a general-purpose computer.

The computer 1000 includes a bus 1020, a processor 1040, a memory 1060, a storage device 1080, an input and output interface 1100, and a network interface 1120. The bus 1020 is a data transmission path through which the processor 1040, the memory 1060, the storage device 1080, the input and output interface 1100, and the network interface 1120 transmit and receive data to and from each other. Here, a method of connecting the processor 1040 and the like to each other is not limited to bus connection. The processor 1040 is a processor such as a central processing unit (CPU), a graphics processing unit (GPU), or a field-programmable gate array (FPGA). The memory 1060 is a main storage device that is realized using a random access memory (RAM) or the like. The storage device 1080 is an auxiliary storage device that is realized using a hard disk drive, a solid state drive (SSD), a memory card, a read only memory (ROM), or the like. Here, the storage device 1080 may be configured by hardware similar to the hardware of the main storage device such as RAM.

The input and output interface 1100 is an interface for connecting the computer 1000 and an input and output device. The network interface 1120 is an interface for connecting the computer 1000 to a communication network. The communication network is, for example, a local area network (LAN) or a wide area network (WAN). A method of connecting the network interface 1120 to the communication network may be wireless connection or a wired connection. In FIG. 3, the computer 1000 is connected to the camera 10 through the network interface 1120.

The storage device 1080 stores a program module that realizes the functional unit of the comparison apparatus 2000. The processor 1040 realizes a function corresponding to each program module by reading each program module into the memory 1060 and executing the program module.

<Camera 10>

The camera 10 is a device having a function of capturing and then generating image data (captured image 12) representing a result of the capturing. The camera 10 may be a video camera that generates a video or a still camera that generates a still image. In a case where the camera 10 generates a video, a captured image 12 is a video frame of the video.

The comparison apparatus 2000 may handle a plurality of cameras 10. In this case, the comparison apparatus 2000 performs processing of determining a registered object included in each captured image 12 obtained from each of the plurality of cameras 10.

<Object Information Storage Device 60 and Position Information Storage Device 70>

The object information storage device 60 and the position information storage device 70 are any storage devices which allow an access from the comparison apparatus 2000. Note that the object information 30 and the position information 40 may be stored in one storage device. That is, one storage device may have both a function as the object information storage device 60 and a function as the position information storage device 70. Here, in a case where both the object information 30 and the position information 40 are stored in one storage device, the object information 30 and the position information 40 may be realized by one piece of information (for example, one table) obtained by merging the object information 30 and the position information 40, or may be realized by individual information (for example, tables different from each other).

<Flow of Processing>

Figure 4:
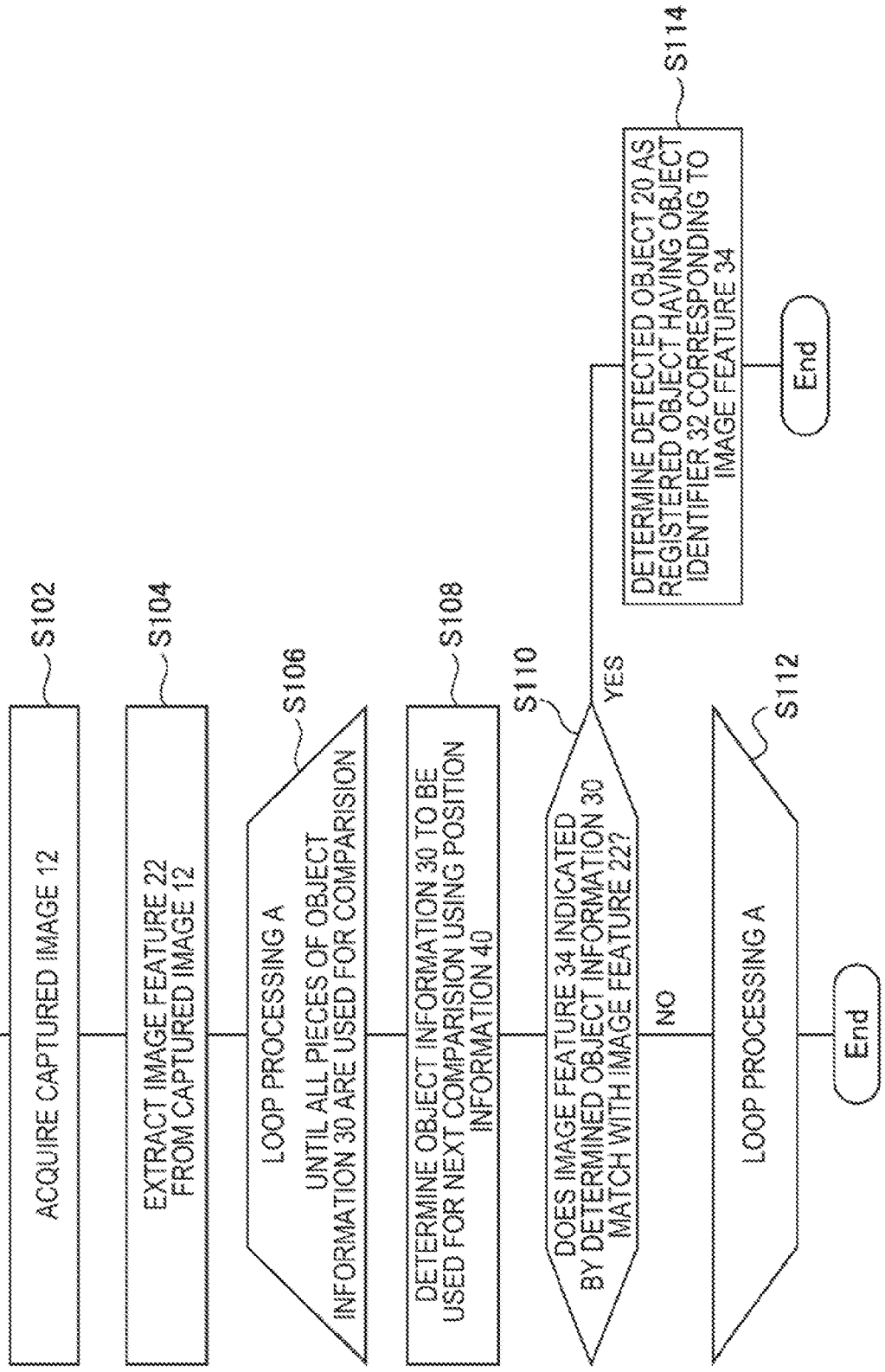
FIG. 4 is a flowchart illustrating a flow of processing executed by the comparison apparatus according to the example embodiment 1.

FIG. 4 is a flowchart illustrating a flow of processing executed by the comparison apparatus 2000 according to the example embodiment 1. The extraction unit 2020 acquires a captured image 12 (S102). The extraction unit 2020 extracts an image feature 22 from the captured image 12 (S104).

Steps of S106 to S112 correspond to a loop processing A executed for each of the pieces of object information 30. In S106, the determination unit 2040 determines whether or not there is object information 30 that has not yet been used for comparison. In a case where comparison has already been performed for all the object information 30, the loop processing A is ended. Thereby, the processing of FIG. 4 ends without determining the detected object 20.

On the other hand, in a case where there is object information 30 that has not yet been used for comparison, the processing of FIG. 4 proceeds to S108. The determination unit 2040 determines object information 30 to be used for the next comparison from the object information 30 that has not yet been used for comparison, based on the position information 40 of each registered object (S108). The determination unit 2040 determines whether or not the image feature 34 indicated by the determined object information 30 matches with the image feature 22 extracted in S104 (comparison of the image feature 34 and the image feature 22) (S110).

In a case where it is determined that the image feature 34 does not match with the image feature 22 (NO in S110), the processing of FIG. 4 proceeds to S112 (S112). Since S112 is the end of the loop processing A, the processing of FIG. 4 returns to S106.

In a case where it is determined that the image feature 34 matches with the image feature 22 (YES in S110), the determination unit 2040 determines the detected object 20 as a registered object having an object identifier 32 corresponding to the image feature 34 (S114). The processing of FIG. 4 is ended.

Note that the flowchart illustrated in FIG. 4 is an example of a flow of processing performed by the comparison apparatus 2000 and the flow of the processing performed by the comparison apparatus 2000 is not limited to the flow illustrated in FIG. 4. For example, in FIG. 4, in the loop processing A, the object information 30 to be used for the next comparison is sequentially determined. On the other hand, for example, the comparison order of each of the pieces of object information 30 may be determined before starting the loop processing A, and the object information 30 may be used for comparison in order in which the determined comparison order is earlier.

<Acquisition of Captured Image 12: S102>

The extraction unit 2020 acquires the captured image 12 from the camera 10 (S102). Here, as a technique of acquiring the captured image generated by the camera, an existing technique may be used. For example, the camera 10 is configured to transmit the captured image 12 to the comparison apparatus 2000 every time a new captured image 12 is generated. The comparison apparatus 2000 acquires the captured image 12 by receiving the captured image 12 transmitted from the camera 10.

In addition, for example, the camera 10 may put the generated captured image 12 into a storage device which allows an access from the comparison apparatus 2000. In this case, for example, the comparison apparatus 2000 acquires an unacquired captured image 12 by periodically accessing the storage device.

Note that the extraction unit 2020 may acquire a part of the captured images 12 generated by the camera 10 instead of all the captured images 12. For example, the camera 10 transmits one of a plurality of captured images 12 generated during a predetermined period, to the comparison apparatus 2000. In addition, for example, the comparison apparatus 2000 acquires only the latest captured image 12 at the time of the periodical access to a storage device in which the captured images 12 are stored.

<Extraction of Image Feature 22: S104>

The extraction unit 2020 extracts the image feature 22 from the captured image 12 (S104). Before performing the extraction, the extraction unit 2020 performs processing of detecting an object from the captured image 12. The object detected by the processing is referred to as a detected object 20. Note that, as a specific technique of detecting an object from an image, an existing technique may be used. For example, the extraction unit 2020 detects an image region which is not included in the background region (a so-called foreground region) from the captured image 12, and detects the detected foreground region as a detected object 20.

The extraction unit 2020 performs processing of extracting the image feature 22 from the detected object 20 detected from the captured image 12. Here, as a technique of extracting an image feature from an image region representing an object, an existing technique may be used. Note that, in a case where the detected object 20 is a person, it is particularly preferable to extract an image feature from an image region representing a face.

<Object Information 30>

The object information 30 is information in which an identifier of a registered object is associated with an image feature of the registered object. There are various methods of generating the object information 30 for the registered object. For example, in a case where the camera 10 is provided in a facility, a user of the facility performs use registration of the facility in advance. Hereinafter, an apparatus used for use registration is referred to as a registration apparatus. The registration apparatus generates object information 30 based on a result of use registration described later, and puts the generated object information 30 into the object information storage device 60.

In a case where the registration apparatus is provided in a facility, for example, the registration apparatus is provided near an entrance or a reception of the facility (for example, a check-in counter at an airport). In this case, a user performs use registration by operating the registration apparatus.

In addition, for example, the registration apparatus may be realized as a server machine that receives a use registration request from a user terminal through a network. In this case, for example, the registration apparatus is realized as a web server that provides a web site for use registration. A user can perform use registration of the facility by accessing the website using a user's own terminal (a PC, a sample terminal, or the like).

The registration apparatus receives registration of personal information such as a name and an address from a user of the facility. At this time, the user also performs registration of an image including the user own (for example, a face picture). The registration apparatus extracts an image feature of the user from the registered image, and generates object information 30 in which the image feature (corresponding to the image feature 34) is associated with an identifier of the user (corresponding to the object identifier 32). As the identifier of the user, a value generated by the registration apparatus may be set, or a value input by the user (for example, a passport number) may be set.

The image of the user may be registered by registering image data prepared by the user, or may be registered by using a camera attached to the registration apparatus. In the latter case, this camera captures a user and generates image data, and the image data is registered as an image of the user.

Here, it is assumed that an object other than a person is handled as the detected object 20. In this case, an administrator or the like of the object performs registration for using the object in the facility in the same manner as the use registration. For example, in a case where a machine such as a robot is handled as the detected object 20, an administrator of the machine performs registration for using the machine in the facility. At this time, an image of the machine is registered in addition to personal information of the user. The same applies to a case where the detected object 20 is an animal or the like.

<Position Information 40>

The position information 40 indicates a position of the registered object in association with the identifier of the registered object. Further, the position information 40 may further indicate a time when the registered object is detected at the position (detection time 46).

Here, there are various ways to represent a position of an object. For example, a position of a registered object is represented by coordinates in a system used to determine a position of an object, such as a global positioning system (GPS) or a beacon system. In this case, a sensor (such as a GPS sensor or a beacon receiver) for determining coordinates is used. For example, in a case where a person is handled as the detected object 20, coordinates of the person are determined using a GPS sensor provided in a mobile terminal owned by the person or a beacon receiver owned by the person. In a case where an object other than a person is handled as the detected object 20, for example, a sensor is provided in the registered object. Note that, as a technique of representing a position of a registered object by coordinates using a GPS or a beacon, an existing technique may be used.

In a case where a coordinate determined by a GPS sensor or a beacon receiver is used as the position 44 indicated by the position information 40, for example, a mobile terminal in which the sensor is provided generates the position information 40 so that the object identifier 42 indicates an identifier of the mobile terminal (an address or the like), the position 44 indicates the coordinate, and the detection time 46 indicates the detection time of the coordinate. For example, each mobile terminal periodically transmits the position information 40 to an apparatus that collects the position information 40 (hereinafter, a position information collection apparatus). The position information apparatus puts the received position information 40 into the position information storage device 70.

In addition, for example, the position of the registered object may be determined using a radio wave intensity of a radio wave received by the mobile terminal associated with the registered object. More specifically, it is assumed that the registered object such as a person owns a mobile terminal. Further, it is assumed that a transmitter which transmits a predetermined radio wave, such as a wireless LAN access point, is provided in a facility in which the comparison apparatus 2000 is used. In this case, the position of the mobile terminal can be estimated based on an intensity of the radio wave received from each transmitter by the mobile terminal. Therefore, for example, the position of the registered object can be determined by a combination of "an identifier of the transmitter and an intensity of the radio wave received from the transmitter" obtained from the mobile terminal owned by the registered object. In this case, as the object identifier 42, an identifier of the mobile terminal may be used. Further, as the detection time 46, a time when the mobile terminal receives the radio wave may be used. Even in this case, the position information 40 is generated by each mobile terminal.

Further, the position of the mobile terminal may be calculated as a coordinate representing a position in the facility based on the position of each transmitter and the radio wave intensity of the radio wave received from each transmitter by the mobile terminal. Note that, as a technique of calculating the position of the receiver based on the position of each of the plurality of transmitters and the intensity of the radio wave received from each of the plurality of transmitters by the receiver, an existing technique may be used.

As described above, each mobile terminal transmits the generated position information 40 to the position information collection apparatus. The position information apparatus stores the received position information 40 in the position information storage device 70.

In addition, for example, the position of the registered object may be determined by an access point that a mobile terminal associated with the registered object accesses. The access point can record a combination of an address of the mobile terminal that accesses the access point (for example, a MAC address) and an access date and time. Therefore, it is able to generate the position information 40 so that the object identifier 42 indicates the address, the position 44 indicates the identifier of the access point (such as an address or an SSID), and the detection time 46 indicates the access date and time.

In this case, the access point generates the position information 40 for each mobile terminal that accesses the access point, and transmits the generated position information 40 to the position information collection apparatus. The position information apparatus puts the received position information 40 into the position information storage device 70.

Further, the position of the registered object may be determined by an identifier of the camera 10 that generates the captured image 12 including the registered object. For example, it is assumed that the detected object 20 is detected from the captured image 12 generated by the camera c1 at a certain time t1. It is assumed that the comparison apparatus 2000 determines the detected object 20 and thus the identifier of the detected object 20 is determined as obj1. In this case, it can be considered that the position of the registered object determined as obj1 at the time t1 is within the imaging range of the camera c1. Therefore, for example, it is able to generate the position information 40 so that the object identifier 42 indicates obj1, the position 44 indicates c1, and the detection time 46 indicates t1.

In this case, the comparison apparatus 2000 generates the position information 40 for the registered object determined as the detected object 20. The comparison apparatus 2000 stores the generated position information 40 in the position information storage device 70.

<Association Between Object Information 30 and Position Information 40>

For the object identifier 32 and the object identifier 42, the same type of information may be used, or different types of information may be used. For example, in the latter case, a passport number or the like input at the time of use registration is used as the object identifier 32, and an identifier or the like of the mobile terminal is used as the object identifier 42. In this case, the same type of identifier as the object identifier 42 is included in the object information 30 in addition to the object identifier 32.

For example, it is assumed that a user performs use registration using a registration apparatus and thus object information 30 for the user is generated. In this case, the user also performs registration of information used as the object identifier 42 at the time of use registration. For example, in a case where the identifier of the mobile terminal is used as the object identifier 42, the user registers the identifier of the mobile terminal owned by the user. In this way, the object information 30 includes information corresponding to the object identifier 42. By using the information, the object information 30 and the position information 40 can be associated with each other.

For example, in a case of determining the comparison order for certain object information 30, the determination unit 2040 searches for the position information 40 using the information which corresponds to the object identifier 42 and is indicated in the object information 30. In this way, the position information 40 for the registered object determined by the object information 30 can be acquired.

<Determination of Comparison Order>

The determination unit 2040 determines the comparison order of the object information 30 based on a relationship between the position of the registered object indicated by the position information 40 of each registered object and the position of the camera 10 that generates the acquired captured image 12. For example, as the registered object is estimated to be present at a position closer to the camera 10, the determination unit 2040 sets the comparison order of the object information 30 of the registered object to be earlier. Here, as will be described later, by considering a direction in which the registered object is to move, the comparison order of the object information 30 of the registered object is not necessarily set to be earlier as the registered object is estimated to be present at a position closer to the camera 10.

For example, for the registered object represented by each of the plurality of pieces of object information 30, the determination unit 2040 acquires the position information 40 of the registered object, and calculates a distance between the position of the registered object indicated by the position information 40 and the position of the camera 10. The determination unit 2040 sets the comparison order of the object information 30 of the registered object to be earlier as the calculated distance is shorter.

There are various methods of calculating the distance between the position of the registered object indicated by the position information 40 and the position of the camera 10. For example, in a case where both the position of the registered object and the position of the camera 10 are represented by coordinates, the distance between the position of the registered object and the position of the camera 10 can be calculated as a distance between the coordinates. In addition, for example, it is assumed that the position of the registered object is represented by an identifier of a radio wave transmitter such as a wireless LAN access point. In this case, the distance between the position of the registered object and the position of the camera 10 may also be represented by how close the transmitter indicated as the position of the registered object is from the camera 10. Specifically, it is assumed that a distance between the transmitter n-th closest from the camera 10 and the camera 10 is n (n is a natural number).

Here, there may be a plurality of registered objects having the same distance from the camera 10. For example, there is a case where both pieces of the position information 40 of two registered objects indicate the identifier of the transmitter second closest from the camera 10. In this case, for example, the determination unit 2040 may handle the registered object corresponding to the position information 40 whose detection time 46 is later (a difference between the current time and the detection time 46 is smaller) as being closer to the camera 10. This is because the position information 40 whose detection time 46 is later is considered to be more accurate (have a smaller error from the actual current position).

Further, in a case where the information indicated in the position information 40 is old (in a case where a difference between the detection time 46 and the current time is large), the actual current position of the registered object is likely to be distant from the position represented by the position 44. Therefore, the determination unit 2040 may calculate an estimated current position of the registered object based on the position 44 and the difference between the detection time 46 and the current time. In this case, the determination unit 2040 determines the comparison order of the object information 30 based on the calculated estimated position.

For example, for each registered object, the determination unit 2040 calculates an estimated movement distance of the registered object by multiplying an elapsed time from the generation of the position information 40 for the registered object (a difference between the current time and the detection time 46) by a speed of the registered object. The determination unit 2040 calculates, as an estimated position of the registered object, a position obtained by moving the position of the registered object from the position 44 by the estimated movement distance along a movement direction of the registered object.

Here, the speed and the movement direction of the registered object will be described. As the speed of the registered object, a fixed value may be used regardless of the registered object, or a different value may be used for each registered object. In the latter case, for example, the speed of the registered object is calculated based on an attribute of the registered object. For example, the speed of the registered object is determined in association with a value of each attribute such as a gender or a age group. Further, the attribute value of each registered object is included in the object information 30. The attribute value of the registered object may be obtained by image analysis of an image obtained by capturing the registered object in the past, or may be input by the user at the time of use registration. When calculating the estimated position of a certain registered object, the determination unit 2040 acquires the attribute value of the registered object by referring to the object information 30 for the registered object, and uses the speed of the registered object that is determined in association with the acquired attribute value.

In addition, for example, the speed of the registered object may be calculated based on a change in the past position of the registered object. For example, in a case where the position information 40 for each registered object is updated, a temporal change in the position of the registered object can be recognized by using a plurality of combinations of the position 44 of the registered object and the detection time 46. Therefore, the determination unit 2040 calculates the speed of the registered object using a plurality of pieces of position information 40 (that is, a history of the pieces of position information 40) generated so far for one registered object.

In the case of calculating the estimated position of the registered object, a direction in which the registered object is to move (hereinafter, a predetermined direction) in a place where the camera 10 is provided is determined in advance, and the predetermined direction is handled as a movement direction of the registered object. For example, the predetermined direction is determined in advance based on a structure of the facility at which the comparison apparatus 2000 is operated. For example, at an airport, the movement direction after an entrance of a security inspection counter is considered to be a direction toward a boarding gate.

Further, the determination unit 2040 may determine the comparison order of the registered object based on the position of the camera 10 and the predetermined direction. Specifically, the determination unit 2040 sets an earlier comparison order to each registered object positioned at a place that is forward in the predetermined direction from the position of the camera 10 than to each registered object positioned at a place that is forward in the direction opposite to the predetermined direction from the position of the camera 10.

<<Case Where Place is Divided into Areas>>

Figure 5:
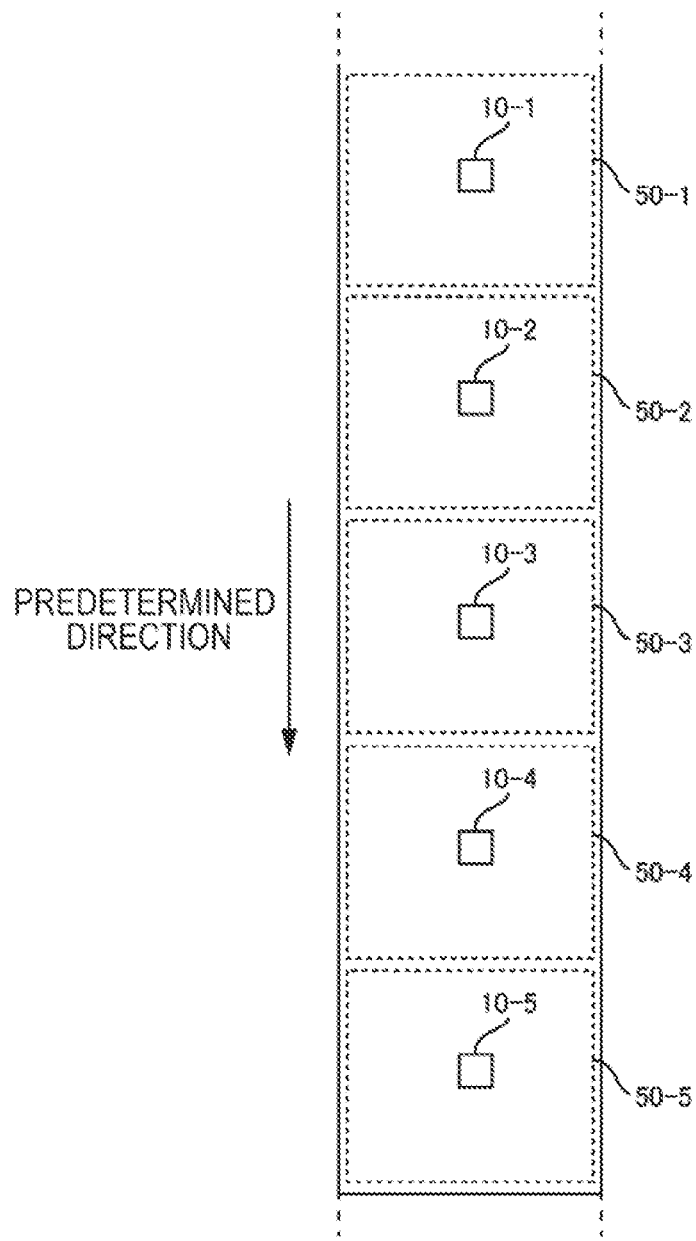
FIG. 5 is a diagram illustrating a case where a place where an object moves is divided into a plurality of areas.

It is considered to divide a place where the registered object moves into a plurality of areas. FIG. 5 is a diagram illustrating a case where a place where the registered object moves is divided into a plurality of areas. FIG. 5 illustrates a passage in a facility at which the comparison apparatus 2000 is used. The passage is divided into five areas 50 (50-1 to 50-5). Here, it is assumed that processing of determining the detected object 20 by the comparison apparatus 2000 is performed in each area. For this reason, a camera 10 is provided in each area.

Hereinafter, for simplicity of explanation, an area where the camera 10 in which the captured image 12 acquired in S102 is generated is provided is referred to as a reference area. For example, it is assumed that the comparison apparatus 2000 performs processing of determining the detected object 20 on the captured image 12 obtained from the camera 10-3 provided in the area 50-3. In this case, it is assumed that the area 50-3 is the reference area.

In a case where a plurality of areas are provided in this way, the determination unit 2040 may determine the order of the area and determine the comparison order of the object information 30 based on the order. For example, the determination unit 2040 sets the order of the area 50 to be earlier as the area is closer to the reference area. The determination unit 2040 sets the comparison order of the object information 30 of the registered object to be earlier as the registered object is positioned in the area with the earlier order.

For example, in the example of FIG. 5, it is assumed that the area 50-3 is the reference area. In this case, for example, the determination unit 2040 uses the pieces of object information 30 in the order of the object information 30 of the registered object positioned in the reference area 50-3, the pieces of object information 30 of the registered objects positioned in the areas 50-2 and 50-4, and the pieces of object information 30 of the registered objects positioned in the areas 50-1 and 50-5.

Here, in a case where there are a plurality of areas 50 having the same distance from the reference area, the determination unit 2040 determines the order of the plurality of areas 50. For example, as described above, the predetermined direction, which is a direction in which the registered object is to move, is defined in advance. For the plurality of areas 50 having the same distance from the reference area, the determination unit 2040 sets an earlier order to the area 50 that is forward in the predetermined direction from the reference area than to the area 50 that is forward in a direction opposite to the predetermined direction from the reference area. For example, in the example of FIG. 5, it is assumed that the reference area is the area 50-3. The order of the area 50-4 is earlier than the order of the area 50-2. Further, the order of the area 50-5 is earlier than the order of the area 50-1. Therefore, the order of the areas is the order of the reference area, the area 50-4, the area 50-2, the area 50-5, and the area 50-1.

In addition, for example, the determination unit 2040 may set an earlier order to all the areas 50 that are forward in the predetermined direction from the reference area than to each area 50 that is forward in the direction opposite to the predetermined direction from the reference area. For example, in the example described above, the order of the areas is the order of the reference area, the area 50-4, the area 50-5, the area 50-2, and the area 50-1.

<<<Plurality of Registered Objects in Same Area>>>

Here, a plurality of registered objects may be positioned in the same area. In this case, for example, the determination unit 2040 may determine the order of each registered object based on the detection time 46 of the position of each registered object. For example, the determination unit 2040 sets the comparison order of the object information 30 of the registered object to be earlier as the detection time 46 is later (the detection time 46 is closer to the current time).

<<<Estimation of Current Area>>>

The determination unit 2040 may estimate an area where the registered object is currently positioned using the position information 40. Specifically, for each registered object, the determination unit 2040 estimates the current position of the registered object using the position 44, the speed of the registered object, and the movement direction of the registered object. The determination unit 2040 handles the area including the current position as the area where the registered object is currently positioned. In this case, the determination unit 2040 uses the area obtained by estimation as an area where each registered object is positioned. Note that a method of estimating the current position of the registered object using the detection time 46 or the like is as described above.

<Comparison: S110>

The determination unit 2040 determines whether or not the image feature 34 indicated by the object information 30 matches with the image feature 22. Here, as a specific method of determining whether or not the image features match with each other, an existing technique may be used. For example, the determination unit 2040 calculates a similarity between the image feature 34 and the image feature 22. When the similarity is equal to or higher than a threshold value, the determination unit 2040 determines that the image features match with each other. On the other hand, when the similarity is lower than the threshold value, the determination unit 2040 determines that the image features do not match with each other.

<Result of Determination>

When the image feature 34 indicated by the object information 30 and the image feature 22 match with each other, the determination unit 2040 determines the detected object 20 as the registered object having the object identifier 32 indicated by the object information 30 (S114). At this time, the determination unit 2040 may output information representing the determination result (hereinafter, output information). Here, the output information is output in various forms. For example, the determination unit 2040 causes the output information to be displayed on a display device connected to the comparison apparatus 2000, to be transmitted to another apparatus, or to be put into a storage device.

The contents of the output information are various. For example, the determination unit 2040 outputs the object information 30 of the registered object determined as the detected object 20, as the output information. At this time, the determination unit 2040 may further output the captured image 12. In this way, the captured image 12 including the detected object 20 and the object information 30 can be recognized in association with each other by a user of the comparison apparatus 2000 (for example, an administrator or a security guard of a facility). Note that it is not necessary to output all pieces of the object information 30 and only a part of the pieces of the object information 30 may be output. Which information of the object information 30 is to be included in the output information is set in advance.

Here, preferably, the object information 30 includes an image of the registered object in addition to the image feature of the registered object. In this case, for example, the determination unit 2040 outputs the captured image 12 together with the image of the registered object included in the object information 30. In this way, the user of the comparison apparatus 2000 can visually compare the image of the detected object 20 with the image of the registered object determined as matching with the detected object 20.

In a case where a plurality of objects are detected from the captured image 12, preferably, the comparison apparatus 2000 highlights (for example, encloses with a frame) the object handled as the detected object 20 in the captured image 12 included in the output information. In this way, the user of the comparison apparatus 2000 can easily recognize the registered object determined as matching with the detected object 20.

Note that, in a case where the detected object 20 cannot be determined (in a case where there is no image feature 34 matching with the image feature 22), preferably, the comparison apparatus 2000 outputs output information representing this fact. The output information includes the fact indicating that the detected object 20 cannot be determined and the captured image 12 including the detected object 20. In this way, the user of the comparison apparatus 2000 can visually recognize the object that cannot be determined by the comparison apparatus 2000.

For example, in a case where use registration of a facility is performed in advance, the object that cannot be determined by the comparison apparatus 2000 is likely to be a person who has not been registered in advance. Therefore, it can be considered that the object requires attention in security of the facility. Accordingly, by providing the output information, a person or the like who requires attention can be easily recognized.

As described above, although the example embodiment of the present invention is described with reference to the drawings, the embodiment has been presented by way of example only, and various configurations other than the embodiment may also be adopted.

A part or all of the example embodiment may be described as in the following appendix, but are not limited thereto.

1. A comparison apparatus comprising:
    an extraction unit that acquires a captured image generated by a camera, and extracts an image feature of a detected object detected from the acquired captured image; and
    a determination unit that determines the detected object using the extracted image feature and object information of each of a plurality of registered objects,
    wherein the object information of each of the registered objects includes an image feature of the registered object, and
    wherein the determination unit determines a comparison order of the object information based on position information of each of the registered objects, and determines the detected object by comparing the image feature included in the object information with the extracted image feature in order from the object information whose determined comparison order is earlier.

2. The comparison apparatus according to 1,
    wherein a place where the registered object is allowed to move includes a plurality of areas, wherein the position information of the registered object indicates an area where the registered object is detected, and wherein the determination unit determines a comparison order of the object information based on proximity between: an area at which the registered object is positioned and which is determined based on the position information of the registered object; and an area where the camera is provided.

3. The comparison apparatus according to 2, wherein, in a place where the camera is provided, a predetermined direction in which the registered object is to move is defined, and wherein the determination unit sets the comparison order of the object information of each of the registered objects positioned in an area that is forward in the predetermined direction from the area where the camera is provided to be earlier than the comparison order of the object information of each of the registered objects positioned in an area that is forward in a direction opposite to the predetermined direction from the area where the camera is provided.

4. The comparison apparatus according to 2, wherein the position information of the registered object indicates a position where the registered object is detected and a detection time of the registered object, and wherein the determination unit sets the comparison order of the object information of each of the plurality of registered objects for which the same area is indicated in the position information to be earlier as the detection time indicated in the position information is later.

5. The comparison apparatus according to any one of 2 to 4, wherein the determination unit estimates an area where the registered object is currently positioned based on the position and the detection time indicated by the position information of the registered object and a speed of the registered object, and determines the comparison order of the object information based on proximity between the estimated area and the area where the camera is provided.

6. The comparison apparatus according to 1, wherein, in a place where the camera is provided, a predetermined direction in which the registered object is to move is defined, and wherein the comparison order of the object information of each of the registered objects positioned in a place that is forward in the predetermined direction from the place where the camera is provided is set to be earlier than the comparison order of the object information of each of the registered objects positioned in a place that is forward in a direction opposite to the predetermined direction from the place where the camera is provided.

7. The comparison apparatus according to 1, wherein the determination unit calculates a distance between a position of the registered object and a position of the camera using the position information of each of the registered objects, and sets the comparison order of the object information of the registered object to be earlier as the calculated distance is shorter.

8. The comparison apparatus according to 7, wherein the position information of the registered object indicates a position where the registered object is detected and a detection time of the registered object, and wherein the determination unit estimates a current position of the registered object based on the position and the detection time indicated by the position information of the registered object and a speed of the registered object, and calculates a distance between the estimated current position and the position of the camera.

9. The comparison apparatus according to 5 or 8, wherein the determination unit calculates the speed of the registered object using a plurality of pieces of the position information generated so far for the registered object.

10. A control method executed by a computer, the control method comprising:

an extraction step of acquiring a captured image generated by a camera and extracting an image feature of a detected object detected from the acquired captured image; and a determination step of determining the detected object using the extracted image feature and object information of each of a plurality of registered objects, wherein the object information of each of the registered objects includes an image feature of the registered object, and wherein, in the determination step, a comparison order of the object information is determined based on position information of each of the registered objects, and the detected object is determined by comparing the image feature included in the object information with the extracted image feature in order from the object information whose determined comparison order is earlier.

11. The control method according to 10, wherein a place where the registered object is allowed to move includes a plurality of areas, wherein the position information of the registered object indicates an area where the registered object is detected, and wherein, in the determination step, a comparison order of the object information is determined based on proximity between: an area at which the registered object is positioned and which is determined based on the position information of the registered object; and an area where the camera is provided.

12. The control method according to 11, wherein, in a place where the camera is provided, a predetermined direction in which the registered object is to move is defined, and wherein, in the determination step, the comparison order of the object information of each of the registered objects positioned in an area that is forward in the predetermined direction from the area where the camera is provided is set to be earlier than the comparison order of the object information of each of the registered objects positioned in an area that is forward in a direction opposite to the predetermined direction from the area where the camera is provided.

13. The control method according to 11, wherein the position information of the registered object indicates a position where the registered object is detected and a detection time of the registered object, and wherein, in the determination step, the comparison order of the object information of each of the plurality of registered objects for which the same area is indicated in the position information is set to be earlier as the detection time indicated in the position information is later.

14. The control method according to any one of 11 to 13, wherein, in the determination step, an area where the registered object is currently positioned is estimated based on the position and the detection time indicated by the position information of the registered object and a speed of the registered object, and the comparison order of the object information is determined based on proximity between the estimated area and the area where the camera is provided.

15. The control method according to 10, wherein, in a place where the camera is provided, a predetermined direction in which the registered object is to move is determined, and wherein the comparison order of the object information of each of the registered objects positioned in a place that is forward in the predetermined direction from the place where the camera is provided is set to be earlier than the comparison order of the object information of each of the registered objects positioned in a place that is forward in a direction opposite to the predetermined direction from the place where the camera is provided.

16. The control method according to 10, wherein, in the determination step, a distance between a position of the registered object and a position of the camera is calculated using the position information of each of the registered objects, and the comparison order of the object information of the registered object is set to be earlier as the calculated distance is shorter.

17. The control method according to 16, wherein the position information of the registered object indicates a position where the registered object is detected and a detection time of the registered object, and wherein, in the determination step, a current position of the registered object is estimated based on the position and the detection time indicated by the position information of the registered object and a speed of the registered object, and a distance between the estimated current position and the position of the camera is calculated.

18. The control method according to 14 or 17, wherein, in the determination step, the speed of the registered object is calculated using a plurality of pieces of the position information generated so far for the registered object.

19. A program causing a computer to execute each step of the control method according to any one of 10 to 18.

What is claimed is:

1. A comparison apparatus comprising:
at least one memory storing instructions; and
at least one processor configured to execute the instructions to:
acquire a captured image generated by a camera;
extract an image feature of a detected object detected from the acquired captured image;
acquire position information of each of a plurality of registered objects;
determine an order of comparison of the plurality of registered objects, based on the position information of each registered object; and
identify the detected object by individually comparing, in the determined order of comparison, a respective plurality of pieces of object information of the plurality of registered objects stored in an object information storage with the extracted image feature until a matching registered object of the plurality of registered objects is found, such that the detected object identified as the matching registered object,
wherein the piece of object information of each registered object includes an image feature of the each registered object.

2. The comparison apparatus according to claim 1,
wherein a place where each registered object is allowed to move includes a plurality of areas,
wherein the position information of each registered object indicates an area where the each registered object is detected, and
wherein the at least one processor is further configured to execute the instructions to:
determine the order of comparison based on, for each registered object, proximity between the area where the each registered object is detected and an area where the camera is provided.

3. The comparison apparatus according to claim 2,
wherein, in a place where the camera is provided, a predetermined direction for each of the plurality of areas in which each registered object is to move is defined, and
wherein the at least one processor is further configured to execute the instructions to:
determine the order of comparison such that each registered object in an area forward in the predetermined direction from the area where the camera is provided is set in the order of comparison ahead of each registered object in an area forward in a direction opposite to the predetermined direction from the area where the camera is provided.

4. The comparison apparatus according to claim 2,
wherein the position information of each registered object indicates a position where the each registered object is detected and a detection time of the each registered object, and
wherein the at least one processor is further configured to execute the instructions to:
determine the order of comparison such that the registered objects detected in a same area are ordered in the order of comparison based on the detection time.

5. The comparison apparatus according to claim 2,
wherein the at least one processor is further configured to execute the instructions to:
estimate the area where each registered object is currently positioned based on a position and detection time indicated by the position information of the each registered object and a speed of the each registered object; and
determine the order of comparison based on, for each registered object, the proximity between the estimated area of the each registered object and the area where the camera is provided.

6. The comparison apparatus according to claim 5,
wherein the at least one processor is further configured to execute the instructions to calculate the speed of each registered object using a plurality of pieces of the position information generated so far for the each registered object.

7. The comparison apparatus according to claim 1, wherein, in a place where the camera is provided, a predetermined direction for each of a plurality of areas in which each registered object is to move is defined, and wherein the at least one processor is further configured to execute the instructions to:

determine the order of comparison such that each registered object in an area forward in the predetermined direction from the area where the camera is provided is set in the order of comparison ahead of each registered object in an area forward in a direction opposite to the predetermined direction from the area where the camera is provided.

8. The comparison apparatus according to claim 1, wherein the at least one processor is further configured to execute the instructions to:

calculate a distance between a position of each registered object and a position of the camera using the position information of the each registered object; and determine the order of comparison in accordance with the distance between the position of each registered object and the position of the camera, from smallest distanced to greatest distance.

9. The comparison apparatus according to claim 8, wherein the position information of each registered object indicates a position where the each registered object is detected and a detection time of the each registered object, and wherein the at least one processor is further configured to execute the instructions to:

estimate a current position of each registered object based on the position and the detection time indicated by the position information of the each registered object and a speed of the each registered object; and calculate the distance between the estimated current position of each registered object and the position of the camera.

10. The comparison apparatus according to claim 9, wherein the at least one processor is further configured to execute the instructions to calculate the speed of each registered object using a plurality of pieces of the position information generated so far for the each registered object.

11. A control method performed by a computer and comprising:

acquiring a captured image generated by a camera;

extracting an image feature of a detected object detected from the acquired captured image;

acquiring position information of each of a plurality of registered objects;

determining an order of comparison of the plurality of registered objects, based on the position information of each registered object; and determining the detected object by individually comparing, in the determined order of comparison, a respective plurality of pieces of object information of the plurality of registered objects stored in an object information storage with the extracted image feature until a matching registered object of the plurality of registered objects is found, such that the detected object identified as the matching registered object, wherein the piece of object information of each registered object includes an image feature of the each registered object.

12. The control method according to claim 11, wherein a place where each registered object is allowed to move includes a plurality of areas, wherein the position information of each registered object indicates an area where the each registered object is detected, and wherein the method comprises determining the order of comparison based on, for each registered object, proximity between the area where the each registered object is detected and an area where the camera is provided.

13. The control method according to claim 12, wherein, in a place where the camera is provided, a predetermined direction for each of the plurality of areas in which each registered object is to move is defined, and wherein the method comprises determining the order of comparison such that each registered object in an area forward in the predetermined direction from the area where the camera is provided is set in the order of comparison ahead of each registered object in an area forward in a direction opposite to the predetermined direction from the area where the camera is provided.

14. The control method according to claim 12, wherein the position information of each registered object indicates a position where the each registered object is detected and a detection time of the each registered object, and wherein the method comprises determining the order of comparison such that the registered objects detected in a same area are ordered in the order of comparison based on the detection time.

15. The control method according to claim 12, wherein the method comprises:

estimating the area where each registered object is currently positioned based on a position and detection time indicated by the position information of the each registered object and a speed of the each registered object; and determining the order of comparison based on, for each registered object, the proximity between the estimated area of the each registered object and the area where the camera is provided.

16. The control method according to claim 15, wherein the method comprises calculating the speed of each registered object is calculated using a plurality of pieces of the position information generated so far for the each registered object.

17. The control method according to claim 11, wherein, in a place where the camera is provided, a predetermined direction for each of a plurality of areas in which each registered object is to move is defined, and wherein the method comprises determining the order of comparison such that each registered object in an area forward in the predetermined direction from the area where the camera is provided is set in the order of comparison ahead of each registered object in an area forward in a direction opposite to the predetermined direction from the area where the camera is provided.

18. The control method according to claim 11, wherein the method comprises:

calculating a distance between a position of each registered object and a position of the camera using the position information of the each registered object; and determining the order of comparison in accordance with the distance between the position of each registered object and the position of the camera, from smallest distanced to greatest distance.

19. The control method according to claim 18, wherein the position information of each registered object indicates a position where the each registered object is detected and a detection time of the each registered object, and wherein the method comprises:

estimating a current position of each registered object based on the position and the detection time indicated by the position information of the each registered object and a speed of the each registered object; and calculating the distance between the estimated current position of each registered object and the position of the camera.

20. A non-transitory computer-readable storage medium storing a program causing a computer to execute the control method according to claim 11.

* * * * *